United States Patent [19]

Ottersbach

[11] Patent Number: 4,914,329

[45] Date of Patent: Apr. 3, 1990

[54] VENTILATION AIR FLOW BLOCK IN AN ELECTRIC MOTOR

[75] Inventor: Thomas V. Ottersbach, Normandy, Mo.

[73] Assignee: Emerson Electric Co., St. Louis, Mo.

[21] Appl. No.: 255,707

[22] Filed: Oct. 7, 1988

[51] Int. Cl.[4] .................. H02K 11/00; H02H 7/085
[52] U.S. Cl. .................. 310/68 C; 361/25; 361/27; 361/103
[58] Field of Search .................. 310/68 C; 361/55, 56, 361/57, 103, 104, 106, 105, 111, 118, 25, 27; 318/334, 471, 473, 788

[56] References Cited

U.S. PATENT DOCUMENTS

| | | | |
|---|---|---|---|
| 4,465,948 | 8/1984 | Oyama et al. | 310/62 |
| 4,499,517 | 2/1985 | Lisauskas | 310/68 C |
| 4,602,872 | 7/1986 | Emery et al. | 310/68 C |
| 4,734,602 | 3/1988 | Hauser et al. | 310/68 C |

Primary Examiner—Patrick R. Salce
Assistant Examiner—Judson H. Jones
Attorney, Agent, or Firm—Polster, Polster and Lucchesi

[57] ABSTRACT

An electric motor includes a fan attached to the end of a rotor shaft extending through an opening in an end shield of the motor housing. The fan forces air about the housing to cool the motor components. A motor protector including a temperature sensor is connected to the stator windings and is sensitive to winding temperatures to shut off the motor when the temperatures exceed a predetermined level. A performed strip of material is positioned over the protector in a tent-like form to block flow of cooling air around the protector. Thus, the protector is kept sensitive to the winding temperature, the material block preventing the protector being influenced by the flow of cooling air within the motor.

5 Claims, 1 Drawing Sheet 4,914,329

VENTILATION AIR FLOW BLOCK IN AN ELECTRIC MOTOR

BACKGROUND OF THE INVENTION

This invention relates to dynamoelectric machines such as electric motors, and more particularly, to a blocking strip for preventing flow of cooling air over a motor protector which responds to stator winding temperatures.

Dynamoelectric machines such as electric motors are typically installed in various types of household appliances as, for example, dishwashers. In operation, electric motors are subject to heat generated by the normal operation of the motor, and heat transferred to the machine from its surrounding environment. To help cool the machine, a ventilating fan may be attached to the motor shaft so to draw air through the motor, through openings in the motor housing.

At the same time, electric motors are typically provided with a protector which includes a sensor for monitoring the temperature of the stator windings. The protector acts as a circuit breaker to interrupt the energy provided the motor when the sensed temperature of the windings exceeds a predetermined temperature level.

A problem therefore arises when cooling air is being drawn through the motor because the air flow over the protector, in effect, desensitizes the protector to the stator winding temperature. This could result in the windings overheating, which, in turn reduces the useful life of the motor and could cause expensive repair to the appliance.

SUMMARY OF THE INVENTION

Among the several objects of the present invention may be noted the improvement to a dynamoelectric machine such, as a motor, for blocking flow of air, normally drawn through the motor, around a temperature sensor used to prevent overheating of the motor windings; the provision of such improvement to be readily installed in the motor during its assembly; the provision of such an improvement to be a pre-shaped thin film material which can be readily accommodated inside the motor housing to fit about the temperature sensor; and, the provision of such improvement which does not interfere with normal operation of the motor.

Briefly, an electric motor includes stator and rotor assemblies, a housing in which these are assembled, a fan attached to an end of the rotor shaft for pulling cooling air through the motor to ventilate it, and a temperature sensor which acts as a circuit breaker to interrupt power to the motor when the internal temperature of the motor's stator windings exceeds a predetermined value. An improvement for the motor comprises means for blocking air flow from the temperature sensor so it remains responsive to the stator winding temperature. This allows the temperature sensor to continue to function as a circuit breaker to interrupt power flow to the motor if the stator winding temperature exceeds the predetermined value. Other objects and features will be in part apparent and in part pointed out hereinafter.

BRIEF DESCRIPTION OF THE DRAWINGS

In the drawings.

Corresponding reference characters indicate corresponding parts throughout the several views of the drawings.

DESCRIPTION OF THE PREFERRED EMBODIMENT

Figure 1:
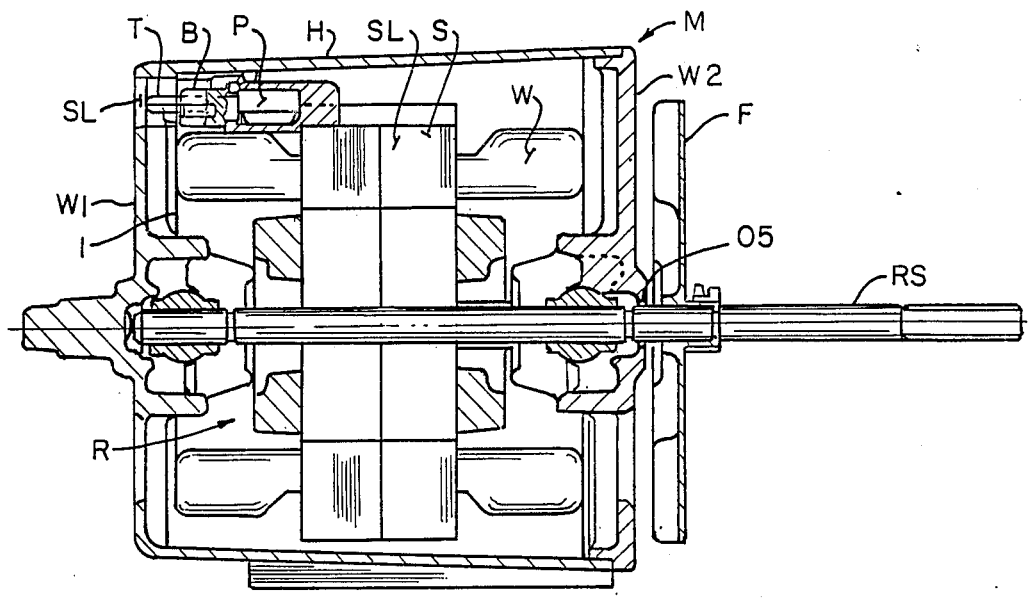
FIG. 1 is a sectional view of a motor showing the improvement of the present invention installed.

Referring now to the drawings, a dynamoelectric machine in the form of an electric motor M includes a stator assembly S and a rotor assembly R. Stator assembly S includes a stator core SC having a central bore opening formed in it for receiving the rotor R in a conventional manner. A plurality of winding receiving slots (not shown) open onto the bore, and receive a series of windings during motor M construction. The rotor assembly includes a rotatable shaft RS and a rotor RR which is affixed to and rotatable with the shaft. These components are installed in a housing H. The housing H has opposed end walls W1 and W2 which close the housing. At least one of the walls W1 and W2 has one or more arcuate openings formed in it for providing ventilating air flow to the motor M. End wall W2 also has a central opening 05 through which one end of shaft RS extends. A fan F is attached to the external end of shaft RS. When motor M is in operation, the rotation of fan F draws air from the housing H to cool the motor M. This air flow draws off the heat generated by the operation of the motor and keeps the motor cool.

Figure 4:
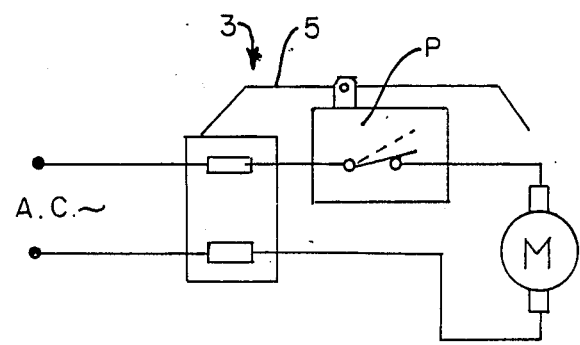
FIG. 4 is a diagrammatic view of the operation of the insulator block of this invention; and, FIG. 5 is a partial view in perspective, illustrating the insulation of the insulator block of this invention.

Power to motor M is supplied from a source of AC power (not shown), through a terminal block B, which is located interior of housing H adjacent end wall W1. The end wall has a slotted opening SL through which electrical wires are attached to terminals T mounted in terminal block B. Electrical energy supplied to motor M is applied to the stator windings. A circuit breaker in the form of a thermal protector P is installed in the motor and is positioned so as to be adjacent the stator windings. The protector P comprises a temperature sensor which monitors the temperature of the stator windings. The protector P is normally closed, as shown in FIG. 4, but the protector will move to its dashed line position in FIG. 4 to create an open circuit if the sensed winding temperature exceeds a predetermined value. This is important because prolonged exposure of the stator windings to excess temperature can damage the windings, and reduce the useful life of the motor. A problem with this arrangement is the air flow over the protector P may be sufficient to lower the temperature sensed by the protector P below that which would normally trip the protector; while, the stator winding temperature still remains higher than it should. Since it is the protector P which is temperature responsive, it is important for continued operation of the motor, that the protector P not be subject to the cooling effect provided by the flow of air over the various motor components. Other constructions are disclosed in copending U.S. Pat. application Ser. Nos. 07/255,756 by Baker, 07,255,755 by Borcherding 07,255,757, by Borcherding et al 07/255,706, by Borcherding et al, 07/255,727, by Hildebrandt et al, 07/255,758, by Borcherding et al, and 07/255,838, by Borcherding, which are assigned to the assignee of the present application, the disclosures of which are intended to be incorporated herein by reference.

An improvement of the present invention comprises an insulator blocking means 1 for blocking the air flow across the protector P which normally would be created by fan F. This means that the protector P remains thermally responsive to the stator winding temperature. Consequently, the protector P will trip if the stator winding temperature exceeds the predetermined temperature, rather than failing to trip because of the heat transfer created by the air flow.

Figure 2:
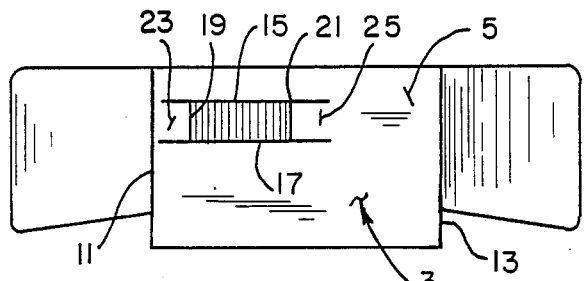
FIG. 2 is a bottom plan view of the insulator block of this invention.
Figure 3:
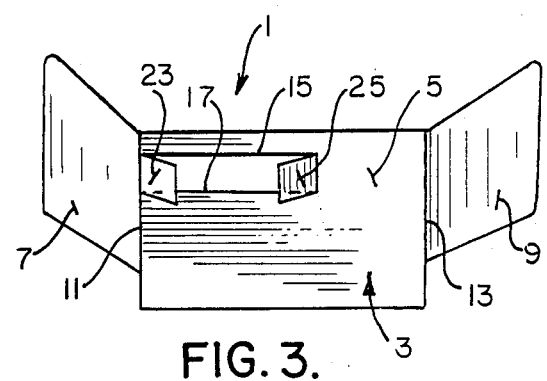
FIG. 3 is a perspective view of the insulator block.
Figure 5:
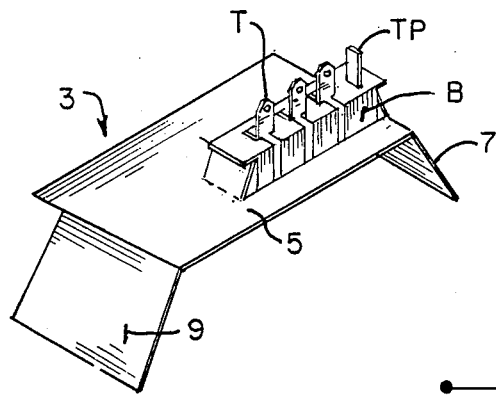

As shown in FIGS. 1-5, blocking means 1 comprises a strip 3 of blocking material configured to fit closely about the circuit breaker and the adjacent portion of the stator winding. Preferably, strip 3 comprises a thin film of a material such as a mylar. As shown in FIGS. 2 and 3, the length of strip 3 is at least three times greater than its width. Strip 3, which may be preformed for ease of insertion into the housing during motor assembly, has a center section 5 and side sections 7 and 9 respectively. Again as shown in FIGS. 2 and 3, a vertical crease 11 is made in strip 3 approximately one-fourth of the way along the length of the strip; and, a second vertical crease 13 is made approximately three-quarters of the way along the length of the strip. Side sections 7 and 9 are then formed by folding strip 3 generally diagonally backwardly at the creases as shown in FIG. 3. As best shown in FIG. 2, the lower portion of each side section is cut away from the stop 3 to enable it to better fit around the a terminal block housing the protector, and the motor windings. The resultant configuration of the side sections is such that the length of each section, at its respective fold or crease, is shorter than the length of the outer edge of the respective section; while, the length of the outer edge is less than the length of the center section at the fold.

As shown in FIGS. 1-5, protector P has a terminal extending toward the top of the housing projection. To accommodate this projection and to accommodate the play in connection used for the motor M when strip 3 is manufactured, a rectangular portion of the center section 5 is removed from one corner of the strip (the upper left corner of the strip as viewed in FIGS. 2 and 3). The area that is removed is adjacent fold 11. The section is removed by making longitudinal slits 15 and 17 in strip 3, and then vertical slits 19 and 21. (See FIG. 2) The resultant shaded area shown in FIG. 2 is then removed. Slits 15 and 17 extend from fold 11 further across central section 5 of the strip than is necessary to define the rectangular portion needed to be removed. As a result, a tab 23 is formed adjacent fold 11 and a tab 25 at the opposite end of the removed rectangular portion. When the strip is folded as shown in FIG. 3, tab 23 projects outwardly from section 5. The tabs 23 and 25 are used to mount the means 1 on the connection block CB, so that the means 1 may be fixed to the motor M prior to motor M insertion in the housing H.

The result is a tent-like structure which fits sufficiently around and over connection block CB to effectively block flow of air across the protector P and the portion of the stator winding adjacent the protector P. As a result, excessive winding temperatures are sensed by the protector P and, if they exceed the predetermined temperature level to which the circuit breaker is set, the circuit breaker will open (the dashed line position in FIG. 4) to interrupt power flow to the motor to shut it down and prevent damage to the stator windings.

Numerous variations, within the scope of the appended claims will be apparent to those skilled in the art in view of the foregoing description and accompanying drawings. Thus, the silhouette of the insulator block means 1 may be varied in other embodiments of this invention. Likewise, the tabs for mounting the insulator block means 1 may be redesigned to conform to the particular connection block being utilized. While certain materials for various components were indicated as preferred, other materials may be employed, if desired. These variations are merely illustrative.

Having thus described the invention, what is claimed and desired to be secured by Letters Patent is:

1. In a dynamoelectric machine comprising a stator assembly, a rotor assembly including a rotatable shaft and a rotor affixed to and rotatable with the shaft, a housing in which the stator assembly and rotor assembly are installed, means for providing cooling air to the stator assembly, and a motor protector including means responsive to the temperature of the stator exceeding a predetermined temperature to interrupt an electrical circuit to the machine, the improvement comprising means for blocking air flow through the machine from flowing over the protector and the portion of the stator adjacent the protector so that protector remains responsive to the second stator temperature to operate the protector's responsive means, the blocking means comprising a strip of blocking material configured to fit closely about the stator adjacent the protector, the strip being folded generally diagonally backwardly at a first point approximately one-quarter way along the length of the strip, and at a second point approximately three-quarters of the way along its length so to form a central section of the strip and two side sections.

2. The improvement of claim 1 wherein portions of each side section are removed so the length of each section at its respective fold is shorter than the length of the outer edge of the section, and the length of the outer edge is less than the length of the center section of the strip at the respective fold.

3. The improvement of claim 2 wherein a rectangular portion of the center section of the strip is removed from a corner of the section adjacent one of the folds, the cuts made in the material to remove the portion being extended from one end of the portion to the adjacent fold whereby a rectangular tab is formed which extends diagonally outwardly from the strip and becomes part of the adjacent side portion of the strip.

4. The improvement of claim 1 wherein the strip comprises a thin film of insulative material.

5. The improvement of claim 1 wherein the strip of material has a length at least three times greater than its width.

* * * * *